United States Patent
Friedl et al.

(10) Patent No.: US 9,215,005 B2
(45) Date of Patent: Dec. 15, 2015

(54) SOCIAL CLOUD APPLICATION-MEDIATED MOBILE DATA HOTSPOT SHARING

(71) Applicant: CISCO TECHNOLOGY, INC., San Jose, CA (US)

(72) Inventors: Stephan Friedl, Fredrick, CO (US); Steven Chervets, Longmont, CO (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 82 days.

(21) Appl. No.: 14/091,322

(22) Filed: Nov. 26, 2013

(65) Prior Publication Data

US 2015/0148104 A1   May 28, 2015

(51) Int. Cl.
| | |
|---|---|
| *H04B 5/00* | (2006.01) |
| *H04B 7/26* | (2006.01) |
| *H04L 29/06* | (2006.01) |
| *H04W 12/06* | (2009.01) |
| *H04W 12/08* | (2009.01) |
| *G06Q 20/14* | (2012.01) |

(52) U.S. Cl.
CPC ............ *H04B 7/26* (2013.01); *G06Q 20/145* (2013.01); *H04L 63/083* (2013.01); *H04L 63/102* (2013.01); *H04W 12/06* (2013.01); *H04W 12/08* (2013.01)

(58) Field of Classification Search
USPC .......................... 455/550.1, 552.1, 41.1–41.3
See application file for complete search history.

(56) References Cited

U.S. PATENT DOCUMENTS

| | | |
|---|---|---|
| 2011/0294502 A1 | 12/2011 | Oerton |
| 2012/0084187 A1 | 4/2012 | Sperling et al. |
| 2012/0110640 A1* | 5/2012 | Donelson et al. .................. 726/3 |
| 2013/0198274 A1 | 8/2013 | Papakipos |
| 2013/0198383 A1 | 8/2013 | Tseng et al. |
| 2013/0210379 A1 | 8/2013 | Cloutier |
| 2013/0223230 A1* | 8/2013 | Swaminathan et al. ...... 370/241 |
| 2014/0086179 A1* | 3/2014 | Shi et al. ........................ 370/329 |

FOREIGN PATENT DOCUMENTS

EP     2876856     5/2015

OTHER PUBLICATIONS

CoovaAAA, "Facebook; Social WiFi Utility," coova.org, Blogs>David's blog, 3 pages [Retrieved and printed Jul. 30, 2013] http://coova.org/node/96.
"wiMAN, the social wifi network, AngelList," Information Page, wiMAN founders Michell Mauro and Massio Ciuffreda, 3 pages [Retrieved and printed Jul. 30, 2013] https://angel.co/wiman-the-social-wifi-network.
EPO Feb. 16, 2015 Extended Search Report and Opinion from European Application Serial No. 14192487.8.
Hodson, Hal., "Bandwidth-sharing app brings connectivity to all," New Scientist Magazine, Issue 2901, Jan. 26, 2013.
Merrill, Scott, "A Look at Karma, A Tiny Wi-Fi Hotspot on a Mission," posted Mar. 2, 2013, Tech Crunch News.

* cited by examiner

*Primary Examiner* — Fayyaz Alam
(74) *Attorney, Agent, or Firm* — Patent Capital Group

(57) ABSTRACT

A method is provided in one example embodiment and includes receiving a message that offers use of a first mobile device as a mobile hotspot for enabling access to a local network; generating a Service Set Identification ("SSID") and a password for the mobile hotspot; and providing the SSID and the password to the first mobile device. The method further includes receiving a request from a second mobile device to access the local network using the mobile hotspot; and providing the SSID and the password to the second mobile device via a second mobile device in accordance with rules that govern access to the local network via the mobile hotspot.

20 Claims, 4 Drawing Sheets

SOCIAL CLOUD APPLICATION-MEDIATED MOBILE DATA HOTSPOT SHARING

TECHNICAL FIELD

This disclosure relates in general to the field of communication networks and, more particularly, to social cloud application-mediated mobile data hotspot sharing.

BACKGROUND

"Tethering" can include any process of using a mobile device, such as a smart phone or an Internet tablet, as a modem for another Wi-Fi-capable device (e.g., a laptop computer, a mobile device, etc.). Tethering enables sharing of the Internet connection of the mobile device with Wi-Fi-capable devices and can be performed using a wireless LAN (or "Wi-Fi") connection, a Bluetooth connection, or a physical connection, such as USB. Virtually all 3G and 4G Android and iOS mobile devices support tethering via Wi-Fi, Bluetooth, and/or USB. For example, a laptop computer without a 3G or 4G network interface could access the Internet by connecting to a Wi-Fi hotspot advertised by a nearby iPhone.

Given recent Federal Communications Commission (FCC) action to force certain carriers to eliminate tethering surcharges for 4 HG connectivity, it would be reasonable to expect an increase in smartphone Wi-Fi tethering, or mobile hotspots. Unfortunately, configuring a smartphone as a Wi-Fi hotspot is functionally equivalent to configuring a structural wireless access point. Specifically, the mobile device must be configured with a Service Set Identification ("SSID") to broadcast and a password for authentication of devices desiring to connect to the hotspot. Devices desiring to connect to a hotspot must treat the hotspot like a conventional Wi-Fi network and select the correct SSID and enter the correct password. This degree of configuration may well be beyond the capacity of many users to complete securely.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a message that offers use of a first mobile device as a mobile hotspot for enabling access to a local network; generating an SSID and a password for the mobile hotspot; and providing the SSID and the password to the first mobile device. The method further includes receiving a request from a second mobile device to access the local network using the mobile hotspot; and providing the SSID and the password to the second mobile device via a second mobile device in accordance with rules established that govern access to the local network via the mobile hotspot.

In one embodiment, the rules specify a relationship between mobile devices attempting to access the local network using the mobile hotspot. The local network may be a Wi-Fi network. The method may further include one or more of accessing a social graph of the first mobile device to determine whether to provide the password to the second mobile device, soliciting payment from the second mobile device prior to providing the password, notifying the first mobile device that the second mobile device has connected to the mobile hotspot. In certain embodiments, the method is implemented using a cloud-based service. Additionally, the request may be received via a cellular data connection and the password may be rendered invalid after a predetermined time period.

Example Embodiments

Figure 1:
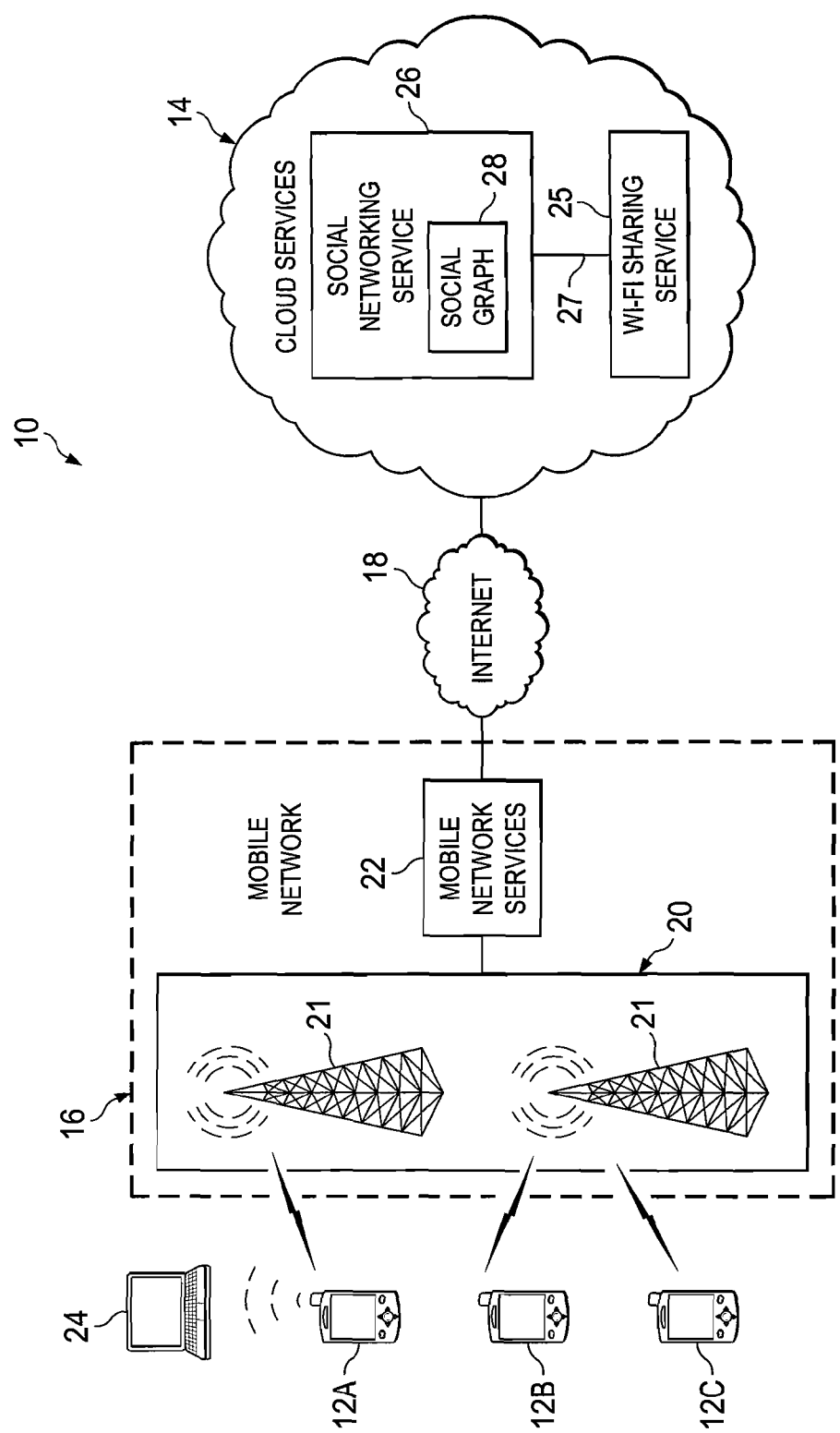
FIG. 1 illustrates a mobile communications/cloud computing network in which embodiments of the present disclosure may be advantageously implemented.

Turning now to the FIGURES, FIG. 1 illustrates a mobile communications/cloud computing system 10 in which embodiments described herein may be advantageously implemented. As shown in FIG. 1, computing system 10 enables a variety of mobile devices, represented in FIG. 1 by mobile devices 12A-12C, to access cloud computing services 14, which may be any number of different services, including, but not limited to, social networking services, email services, document hosting services, data backup services, banking and financial services, and the like via a mobile network 16 that connects mobile devices 12A-12C to Internet 18. Mobile network 16 includes an access network 20, which may comprise a variety of access points 21, such as satellites, access points, and BTSes, for connecting mobile devices 12A-12C to a core network 22 for providing mobile network services to devices 12A-12C.

Continuing to refer to FIG. 1, it will be assumed for the sake of example that device 12A has been configured to function as a mobile hotspot and that a Wi-Fi-capable device 24 is able to access the internet via the hotspot provided by device 12A. As previously noted, device 12A may be manually configured by an owner thereof to function as a hotspot. In accordance with features of embodiments described herein, a sharing service 25 is implemented as a cloud service accessible via an application installed on the mobile device 12A for facilitating mobile hotspot sharing via mobile device 12A. In one embodiment, sharing service 25 is integrated into and/or has access to a social networking service 26 (through a communication channel 27) of which the owner of device 12A is a member and in connection with which he or she has a social graph 28. In one embodiment, communication channel 27 may be implemented using Representational State Transfer ("REST"). As commonly used, and as used herein, the phrase "social graph" is a graph that depicts personal relationships of members of social networking service 26. In one embodiment, social networking service 26 may be Facebook, which makes its social graph available to other services, such as sharing service 25, via a Facebook Open Graph Application Programming Interface ("API"), which is part of the Facebook Platform. Facebook Platform is a software environment that enables third-party developers to create their own applications and services that access data (such as social graph data) in Facebook. The platform includes a set of programming interfaces and tools that enable developers to integrate with the open graph of personal relations.

Embodiments described herein utilize a centralized web, or cloud, sharing service for brokering mobile device to mobile hotspot connections. In some embodiments, the sharing service may be integrated into social networking applications, such as Facebook, to facilitate the sharing of one user's mobile data connection with one or more other users through a simple, non-technical GUI operation via Facebook or other social networking applications. An aspect of embodiments described herein is that a user may specify rules governing with whom he or she is willing to share the mobile hotspot. Configuration of rules may be performed via a social networking application and rules may include: (1) share mobile hotspot with specific friends; (2) share mobile hotspot with all direct friends; (3) share mobile hotspot with friends of friends; and (4) share mobile hotspot with a designated group (e.g., anyone who is a member of a robot club).

As described in detail below, certain embodiments facilitate on-demand sharing of Internet access through mobile hotspots advertised by mobile devices. This approach can reduce the complexity of establishing a connection between two devices on-the-fly and provides a mechanism for advertising hot spots associated with the sharing service. Embodiments described herein are not dependent on infrastructure access points or routers, though the basic capabilities could be extended to infrastructure access points like home routers. In the most basic case, the device granting mobile hotspot access is a smart mobile device, not an infrastructure Wi-Fi access point ("AP"). Specifically, no infrastructure AP is required. Additionally, embodiments described herein do not rely on social networking applications, such as Facebook, merely for authentication; rather, the embodiments leverage a social network graph of the owner of the smart mobile device providing the hotspot ("hotspot provider") to control access to the hotspot. In effect, the hotspot provider's social network becomes an Access Control List ("ACL") for the hotspot. Beyond that, certain embodiments also seek to reduce the complexity of the interaction of the hotspot provider and consumer to the point at which a secure hotspot connection can be created with easy-to-use cloud-based tools, in contrast to requiring the hotspot provider to open the settings panel of his/her device and configure a Wired Equivalent Privacy ("WEP") or Wi-Fi Protected Access ("WPA") password, which must then be provided to the hotspot consumer for manual entry on their access device.

Using certain embodiments, a peer-to-peer hotspot connection could be established without the hotspot provider and hotspot consumer even communicating with one another. This is in direct contrast to at least one application that creates one large, flat Peer-to-Peer ("P2P") Wi-Fi network among smart devices and permits anyone who is a member to potentially consume Wi-Fi on any other member's device. Moreover, it will be recognized that the hotspot SSIDs and WPA passwords are dynamic and ephemeral in nature. In certain embodiments, SSIDs exposed by a hotspot provider's device are generated by the sharing service in accordance with a set of rules that may permit a different device to determine whether a hotspot it can see may belong to the socially-shared hotspot collection. The WPA password is also generated by the sharing service and can be cryptographically difficult, certainly when compared to passwords that human users typically create. In certain embodiments, when the hotspot provider's device disconnects from the hotspot community (which may be embodied in the cloud service), the SSID is discarded. The SSID could be created with a geo-location element that would allow the service to return a very precise Regular Expression ("RegEx") filter for SSIDs to users looking for a hotspot.

The following discussion references various embodiments. However, it should be understood that the disclosure is not limited to specifically described embodiments. Instead, any combination of the following features and elements, whether related to different embodiments or not, is contemplated to implement and practice the disclosure. Furthermore, although embodiments may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any subject matter disclosed herein and shall not be considered to be an element or limitation of the appended claims except where explicitly recited in a claim(s).

As will be appreciated, aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may generally be referred to herein as a "module" or "system." Furthermore, aspects of the present disclosure may take the form of a computer program product embodied in one or more non-transitory computer readable medium(s) having computer readable program code encoded thereon.

Any combination of one or more non-transitory computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or "Flash memory"), an optical fiber, a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus or device.

Computer program code for carrying out operations for aspects of the present disclosure may be written in any combination of one or more programming languages, including an object oriented programming language such as Java™, Smalltalk™, C++ or the like and conventional procedural programming languages, such as the "C" programming language or similar programming languages.

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality and operation of possible implementations of systems, methods and computer program products according to various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in a different order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
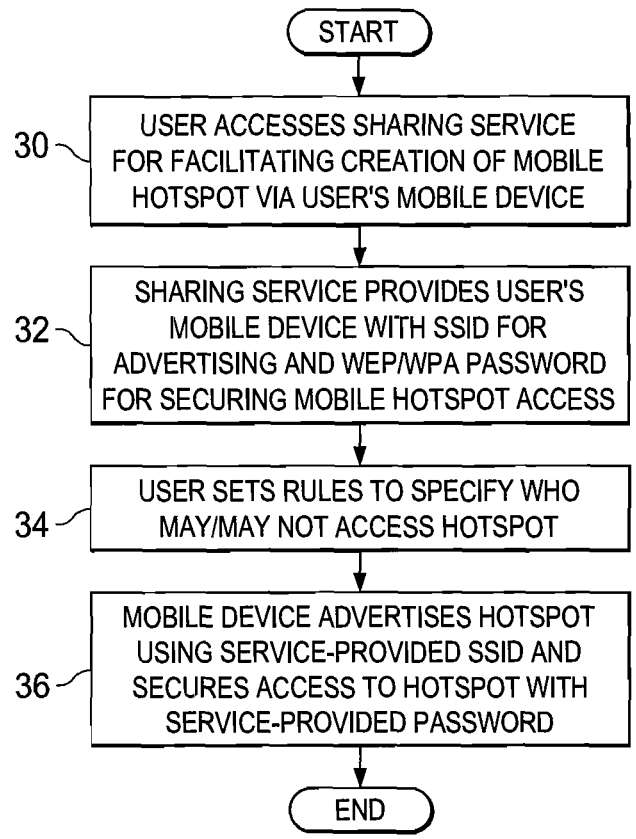
FIG. 2 illustrates a flowchart of configuration of a mobile device as a hotspot using a cloud service in accordance with embodiments of the present disclosure.

FIG. 2 illustrates a flowchart of configuration of a mobile device as a hotspot using the sharing service in accordance with embodiments described herein. Referring to FIG. 2, in step 30, a user who desires to share Wi-Fi access of his/her mobile device via the sharing service (e.g., sharing service 25) accesses the sharing service via an application installed on his/her mobile device.

In step 32, the sharing service provides the mobile device with a coded SSID for identifying and advertising the mobile hotspot to other Wi-Fi-capable devices. The sharing service further provides the mobile device with a WEP or WPA password to secure the network. In step 34, the user may specify particular rules with respect to who is permitted to connect to the mobile hotspot on the user's mobile device. In accordance with certain embodiments, the sharing service may access the social networking service (and specifically, the social graph of the user associated therewith) to allow the user to designate with whom he or she is willing to share the hotspot. For example, the user may indicate a willingness to share the hotspot (1) with specific friends (e.g., selected from a list of friends in the user's social graph); (2) with all direct friends of the user; (3) with all friends of friends of the user; and/or (4) with a specific group of users of the social networking service.

It should be recognized that these are merely examples and that there may be any number of different ways in which to designate users who are authorized to access the mobile hotspot. The user may also designate other terms, such as payment terms and time limitations, in connection with access to the hotspot. Additionally, and/or alternatively, the user may designate a type of mobile device (e.g., smart phone only, tablet only, etc.) that may connect to the network via the mobile hotspot. In step 36, the mobile device advertises the hotspot using the service-provided SSID or other identifier and secures access to the hotspot using the service-provided WEP or WPA password. At this point, the hotspot is available for use by other Wi-Fi-capable devices to access the Internet, so long as the user of those other Wi-Fi-capable devices possesses the WEP/WPA password, as will be described below.

Figure 3:
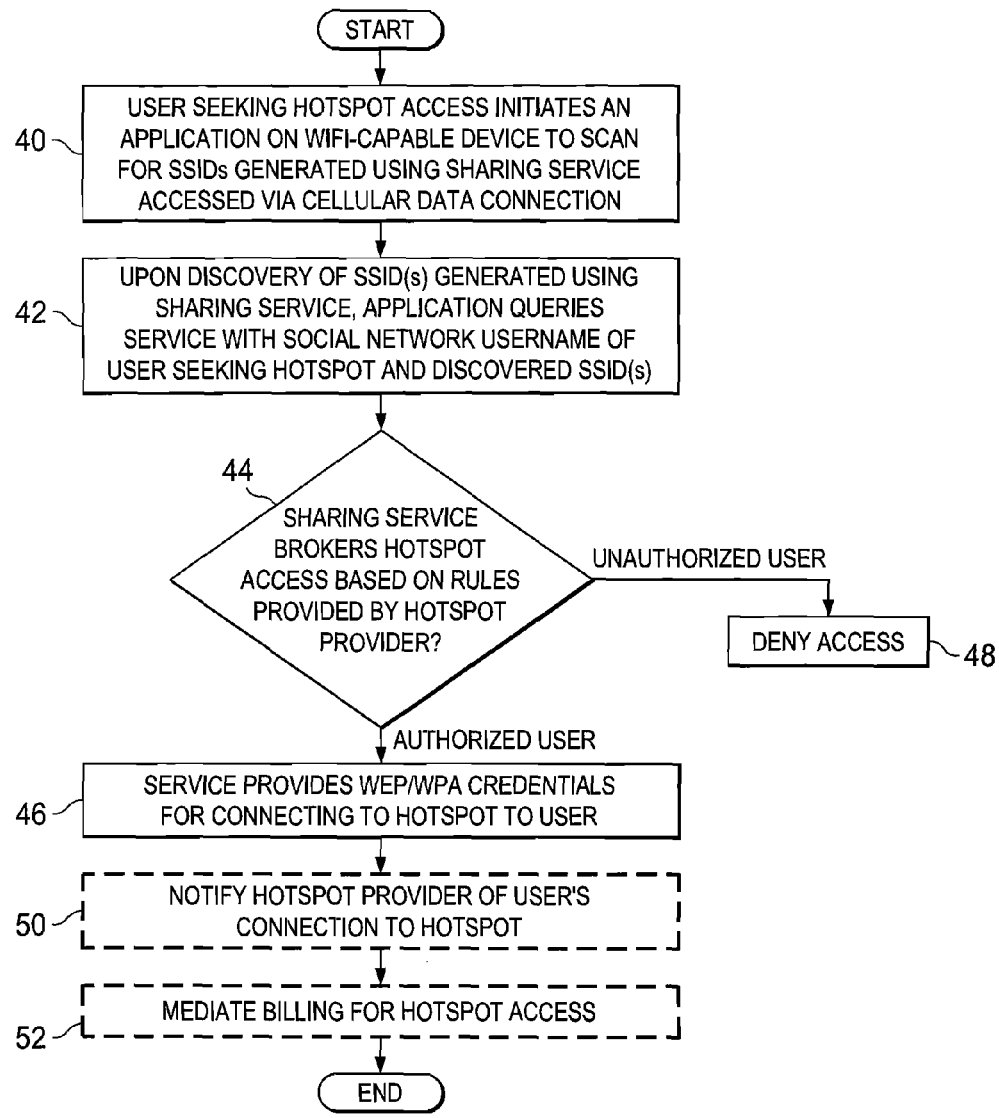
FIG. 3 illustrates a flowchart of access by a Wi-Fi-capable device of a hotspot using a cloud service in accordance with embodiments of the present disclosure.

FIG. 3 illustrates a flowchart of access to the Internet via a hotspot configured using the sharing service in accordance with embodiments described herein. In step 40, a hotspot consumer with a Wi-Fi-capable device seeking a wireless hotspot connection may open a sharing service application on the device. Note that at step 40 or step 42, a user can access the sharing service through their Cellular Data Connection (e.g., 3G or 4G). This could be especially true at step 46, where a service provides credentials through an existing cellular connection.

At step 40, for example, the application connects to the sharing service 25 via the cellular data connection (e.g., 3G or 4G) of the user's device to enable the device to scan for SSIDs that conform to the encoded SSID format of the sharing service. In one embodiment, step 40 may include the client device's querying the sharing service 25 (via the client's cellular data connection) to obtain a RegEx filter for SSIDs. In step 42, upon discovery of one or more conforming SSIDs responsive to the scanning in step 40, the application on the hotspot consumer's device may query the sharing service with the user's social networking user name and the discovered SSID(s). This query may be performed over a cellular carrier-based Internet connection, for users seeking to avoid reaching their bandwidth limit, or through SMS for users without any Internet connectivity at that time.

In step 44, in accordance with features of embodiments described herein, the sharing service broker's hotspot access based on the rules specified by the hotspot provider for sharing Internet connectivity. Access may be based on payment to the hotspot provider, a relationship with the hotspot provider (e.g., as defined in the hotspot provider's social graph), or some combination of the two. For example, if the hotspot provider is the same person as the hotspot consumer, in which case the hotspot provider is merely using one device to provide Internet access for another of his/her devices, no payment would be required; rather, the system would merely grant the second device access to the Internet via the first device. In another example, assuming the hotspot provider has indicated that access will be granted only to direct friends of the hotspot provider, if the hotspot consumer is a direct friend of the hotspot provider, execution will proceed to step 46, described below. Alternatively, using the same case in which the hotspot provider has limited hotspot access to direct friends, if the hotspot consumer is merely a friend of a friend, the hotspot consumer will be denied access, and execution terminates in step 48.

In step 46, the sharing service provides WEP or WPA credentials, as applicable, to the hotspot consumer for enabling the consumer to connect to the hotspot. In optional step 50, the sharing service may notify the hotspot provider of the hotspot consumer's connection to the hotspot. In some embodiments, this step also includes prompting the hotspot provider to confirm that access should be granted before actually granting the hotspot consumer access to the hotspot; in other embodiments, the hotspot provider may simply be informed of the connection. In still other embodiments, no notification is provided and the hotspot provider is not informed that a connection has been made. In optional step 52, in the event that a billing relationship is required, billing could be mediated through a payment system of the social networking site, through PayPal, or through another payment service, (including one integrated with the sharing service).

Figure 4:
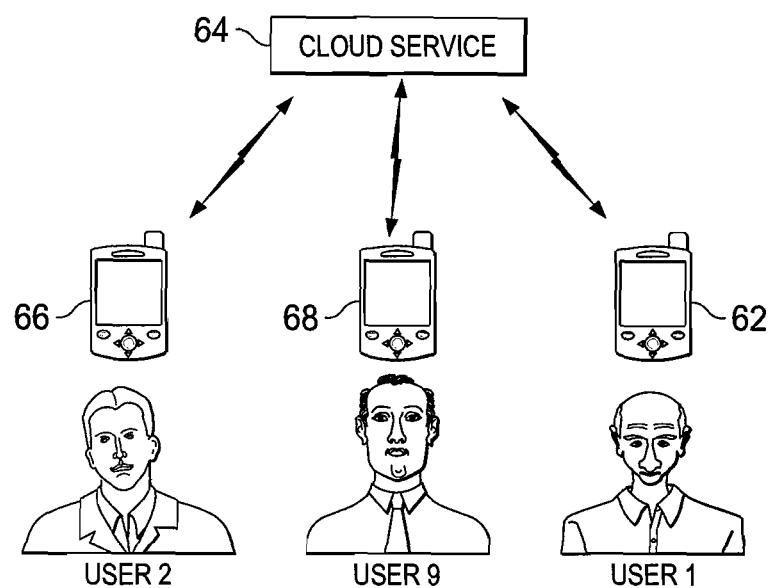
FIGS. 4 and 5 collectively illustrate an example implementation of embodiments of the present disclosure for mobile hotspot sharing activity mediated via a cloud service.
Figure 5:
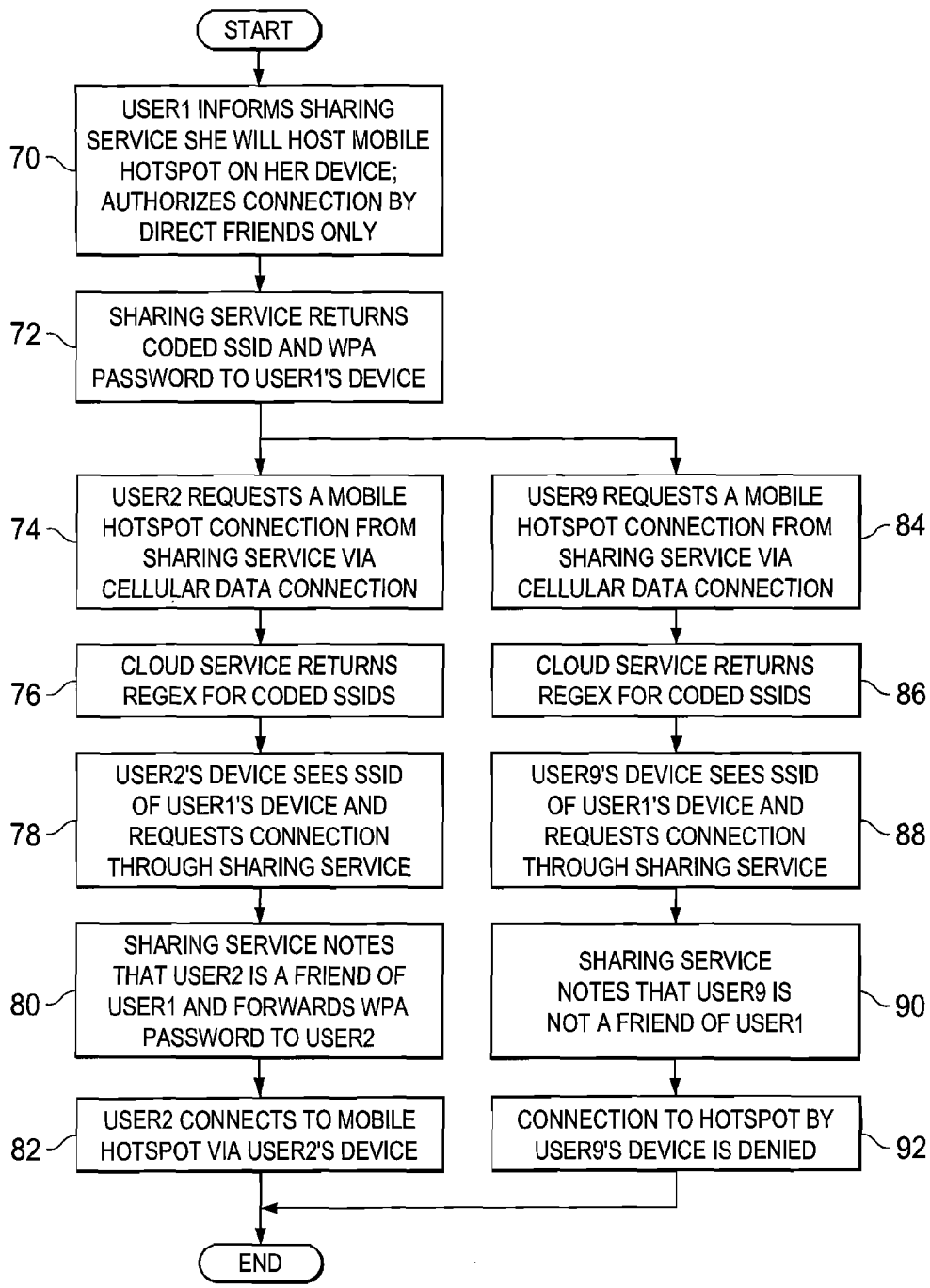

FIGS. 4 and 5 collectively illustrate an example implementation of embodiments described herein for mobile hotspot sharing activity mediated via a cloud service. As illustrated in FIG. 4, USER1 is willing to host a hotspot on her mobile device 62 and would like to use a cloud sharing service 64 to facilitate the process. It will be assumed for the sake of example that, according to a social graph accessible by the sharing service 64, USER1 has four friends, including USER2, USER3, USER4, and USER5. Referring now to FIG. 5, in step 70, USER1 contacts the sharing service 64 to indicate that she will host a mobile hotspot on the device 62 and that only direct friends are authorized to connect to the hotspot. In step 72, the sharing service 64 returns a coded SSID (e.g., "_EPHEMERAL_1") and a WPA password (e.g., "6lt3n2y5") to USER1. In step 74, USER2 contacts the sharing service (e.g., via an application installed on her Wi-Fi enabled device 66) to request a hotspot connection via the device's cellular data connection (e.g., 3G or 4G). In step 76, the sharing service returns a RegEx for coded SSIDs. In step 78, the device 66 sees the SSID_EPHEMERAL_1_ and requests connection to the mobile hotspot identified by that SSID through the sharing service. In step 78, the sharing service determines that USER2 is a friend of USER1 and is therefore permitted to connect to the hotspot. In step 80, the sharing service returns the WPA password 6lt3n2y5 to USER2. In step 82, USER2 connects to the hotspot using the WPA password provided in step 80.

It will be assumed for the sake of example that at a time substantially contemporaneously with steps 74-82, in step 84, a user USER9 contacts the sharing service (e.g., via an application installed on his Wi-Fi enabled device 68) to request a hotspot connection. In step 86, the sharing service returns a RegEx for coded SSIDs. In step 87, the device 86 sees the SSID_EPHEMERAL_1_ and requests connection to the mobile hotspot identified by that SSID through the sharing service. In step 88, the sharing service determines that USER0 is not a friend of USER1 and is therefore not permitted to connect to the hotspot. In step 90, the sharing service denies the device 68 permission to connect to the hotspot.

In an alternative embodiment, the sharing service may prevent the display of USER1's device to USER9, such that USER9 has no opportunity to attempt to access the mobile hotspot provided by USER1's device. In another alternative embodiment, the actual SSIDs associated with mobile hotspots are not displayed to user's attempting to connect to a mobile hotspot via the sharing service; rather, some other form of identification (e.g., longitude and latitude of the location of the provider's device, a relationship designation, or some other descriptor) is provided for each available connection. In yet another alternative embodiment, in steps 74/84, the user seeking a mobile hotspot connection may indicate to the sharing service, via the application executing on the user's device, that he/she would only like to connect to a hotspot meeting certain criteria, such as "friend," "friend of a friend," or "free." In yet another alternative embodiment, the password returned by the sharing service in step 80 is specific to a MAC address of the user's device such that only that device may access the hotspot using the password provided. In still another alternative embodiment, the password may have a TTL value associated therewith such that the password is valid for only a designated amount of time.

In terms of the infrastructure that may be included in mobile communications/cloud computing system 10 in one particular instance, the architecture would be applicable to any communication environments, such as a simple wide area network (WAN) deployment, cable scenarios, broadband generally, fixed wireless instances, and fiber to the x (FTTx), which is a generic term for any broadband network architecture that uses optical fiber in last-mile architectures. Mobile communications/cloud computing system 10 may include a configuration capable of transmission control protocol/internet protocol (TCP/IP) communications for the transmission and/or reception of packets in a network. Mobile communications/cloud computing system 10 may also operate in conjunction with a user datagram protocol/IP (UDP/IP) or any other suitable protocol, where appropriate and based on particular needs. Moreover, the networks discussed herein represent a series of points or nodes of interconnected communication paths for receiving and transmitting packets of information that propagate through mobile communications/cloud computing system 10. The network offers a communicative interface between sources and/or hosts, and may be any LAN, wireless local area network (WLAN), metropolitan area network (MAN), Intranet, Extranet, WAN, virtual private network (VPN), or any other appropriate architecture or system that facilitates communications in a network environment using network elements.

Mobile devices 12A-12C can be associated with clients, customers, or end users wishing to initiate a communication in mobile communications/cloud computing system 10 via some network. The term 'mobile device' is synonymous with apparatus and can be inclusive of any devices used to initiate a communication such as a receiver, a computer, a set-top box, a smart television, an Internet radio device (IRD), a cell phone, a telephone, a router, a switch, a residential gateway (RG), a fixed mobile convergence product, a laptop, a home networking adaptor, an internet access gateway, a smartphone (e.g., a Google Droid, an iPhone), a tablet (e.g., an iPad), a personal digital assistant (PDA), or any other device, component, element, or object capable of initiating voice, audio, video, media, or data exchanges within communication system 10. Mobile devices 12A-12C may also be inclusive of a suitable interface to the human user, such as a display, a keyboard, a touchpad, a remote control, or other terminal equipment. Mobile devices 12A-12C may also be any device that seeks to initiate a communication on behalf of another entity or element, such as a program, a database, or any other component, device, element, or object capable of initiating an exchange within mobile communications/cloud computing system 10. In addition, mobile devices 12A-12C may be any devices that a service provider may deploy within the service provider's own network premises. Data, as used herein in this document, refers to any type of numeric, voice, video, media, or script data, or any type of source or object code, or any other suitable information in any appropriate format that may be communicated from one point to another.

Wi-Fi sharing service 25 and social networking service 26 are network elements that can facilitate the network communication activities discussed herein. As used herein in this Specification, the term 'network element' is meant to encompass servers, routers, switches, cable boxes, gateways, bridges, loadbalancers, cellular access concentrators, WiMAX access concentrators, firewalls, inline service nodes, proxies, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms, communication protocols, and interfaces that allow for the effective exchange of data or information.

In one implementation, mobile devices 12A-12C and/or Wi-Fi sharing service 25 and/or social networking service 26 include software to achieve (or to foster) the network communication activities discussed herein. This could include, for example, the implementation of instances of a hotspot sharing module, where these modules interact, perform reciprocating functions, and/or suitably coordinate their activities with peers. Additionally, each of these elements can have an internal structure (e.g., a processor, a memory element, etc.) to facilitate some of the operations described herein. In other embodiments, these network communication activities may be executed externally to these elements, or included in some other network element to achieve the intended functionality. Alternatively, mobile devices 12A-12C and/or Wi-Fi sharing service 25 and/or social networking service 26 may include software (or reciprocating software) that can coordinate with other network elements in order to achieve the network communication activities described herein. In still other embodiments, one or several devices may include any suitable algorithms, hardware, software, components, modules, interfaces, or objects that facilitate the operations discussed herein with respect to hotspot sharing activities.

Note that in certain example implementations, the mobile hotspot sharing activities outlined herein may be implemented by logic encoded in one or more tangible media (e.g., embedded logic provided in an application specific integrated circuit ("ASIC"), digital signal processor ("DSP") instructions, software (potentially inclusive of object code and source code) to be executed by a processor, or other similar machine, etc.). In some of these instances, a memory element, embodied in any of the mobile or Wi-Fi-capable devices or nodes of the networks shown in FIG. 1, can store data used for the operations described herein.

This includes the memory element being able to store software, logic, code, or processor instructions that are executed to carry out the activities described in this Specification. A processor can execute any type of instructions associated with the data to achieve the operations detailed herein in this Specification. In one example, the processor, embodied in any of the mobile or Wi-Fi-capable devices or nodes of the networks shown in FIG. 1, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable ROM ("EEPROM")) or an ASIC that includes digital logic, software, code, electronic instructions, or any suitable combination thereof.

In one example implementation, at least one of mobile devices 12A-12C, including Wi-Fi-enabled devices, and Wi-Fi sharing service 25 include software in order to achieve the mobile hotspot sharing functionality outlined herein. The mobile devices and computer device(s) on which the sharing service is implemented can include memory elements for storing information to be used in achieving the mobile hotspot sharing functionality outlined herein. Additionally, each of these devices may include a processor that can execute software or an algorithm to perform the mobile hotspot sharing activities as discussed in this Specification. These devices may further keep information in any suitable memory element (random access memory ("RAM"), ROM, EPROM, EEPROM, ASIC, etc.), software, hardware, or in any other suitable component, device, element, or object where appropriate and based on particular needs. Any of the memory items discussed herein should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that system 10 (and its teachings) are readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the steps in the preceding flow diagrams illustrate only some of the possible signaling scenarios and patterns that may be executed by, or within, system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 10 in that any suitable arrangements, chronologies, configurations, and timing mechanisms may be provided without departing from the teachings of the present disclosure.

In a separate endeavor, portions of system 10 can generally be configured or arranged to represent the LTE architecture, the 3G architecture applicable to UMTS environments, or any suitable networking system, or arrangement that provides a communicative platform for system 10. In other examples, FIG. 1 could readily include an SGSN, a gateway GPRS support node (GGSN), any type of network access server, network node, etc. Moreover, the present disclosure is equally applicable to other cellular and/or wireless technology including CDMA, Wi-Fi, WiMax, etc.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
   receiving a message that offers use of a first mobile device as a mobile hotspot for enabling access to a local network;
   generating a Service Set Identification ("SSID") and a password for the mobile hotspot;
   providing the SSID and the password to the first mobile device;
   receiving a request from a second mobile device to access the local network using the mobile hotspot; and
   providing the SSID and the password to the second mobile device in accordance with rules that govern access to the local network via the mobile hotspot, wherein the rules specify a combination of:
      verifying, based on a social graph of the first mobile device, a relationship between the first mobile device and the second mobile device, and
      receiving confirmation of a payment from the second mobile device.

2. The method of claim 1, further comprising:
   accessing the social graph of the first mobile device to determine whether to provide the password to the second mobile device.

3. The method of claim 1, wherein the local network is a Wi-Fi network.

4. The method of claim 1, further comprising soliciting the payment from the second mobile device prior to providing the password.

5. The method of claim 1, further comprising notifying the first mobile device that the second mobile device has connected to the mobile hotspot.

6. The method of claim 1, wherein the method is implemented using a cloud-based service.

7. The method of claim 1, wherein the request is received via a cellular data connection.

8. The method of claim 1, wherein the password is rendered invalid after a predetermined period of time.

9. One or more non-transitory tangible media that includes code for execution and when executed by a processor is operable to perform operations, comprising:
   receiving a message that offers use of a first mobile device as a mobile hotspot for enabling access to a local network;
   generating an SSID and a password for the mobile hotspot;
   providing the SSID and the password to the first mobile device;
   receiving a request from a second mobile device to access the local network using the mobile hotspot; and
   providing the SSID and the password to the second mobile device in accordance with rules that govern access to the local network via the mobile hotspot, wherein the rules specify a combination of:
      verifying, based on a social graph of the first mobile device, a relationship between the first mobile device and the second mobile device, and
      receiving confirmation of a payment from the second mobile device.

10. The media of claim 9, wherein the operations further comprise:
    accessing the social graph of the first mobile device to determine whether to provide the password to the second mobile device.

11. The media of claim 9, wherein the operations further comprise soliciting the payment from the second mobile device prior to providing the password.

12. The media of claim 9, wherein the operations further comprise notifying the first mobile device that the second mobile device has connected to the mobile hotspot.

13. The media of claim 9, wherein the password is rendered invalid after a predetermined period of time.

14. An apparatus, comprising:
    a memory element configured to store data; and
    a processor operable to execute instructions associated with the data, wherein the apparatus is configured to:
       receive a message offering use of a first mobile device as a mobile hotspot for enabling access to a local network;
       generate a Service Set Identification ("SSID") and a password for the mobile hotspot;
       provide the SSID and the password to the first mobile device;
       receive a request from a second mobile device to access the local network using the mobile hotspot; and
       provide the SSID and the password to the second mobile device in accordance with rules that govern access to the local network via the mobile hotspot, wherein the rules specify a combination of:
          verifying, based on a social graph of the first mobile device, a relationship between the first mobile device and the second mobile device, and
          receiving confirmation of a payment from the second mobile device.

15. The apparatus of claim 14, wherein the apparatus is further configured to access the social graph of the first mobile device to determine whether to provide the password to the second mobile device.

16. The apparatus of claim 14, wherein the apparatus is further configured to solicit the payment from the second mobile device prior to providing the password.

17. The apparatus of claim 14, wherein the apparatus is further configured to notify the first mobile device that the second mobile device has connected to the mobile hotspot.

18. The method of claim 1, further comprising:
    receiving at least a portion of the social graph from a social networking service; and
    when it is determined, based on the rules, that the payment from the second mobile device is required to access the local network using the mobile hotspot, mediating the payment through a payment system of the social networking service.

19. The media of claim 9, wherein the operations further comprise:
    receiving at least a portion of the social graph from a social networking service; and
    when it is determined, based on the rules, that the payment from the second mobile device is required to access the local network using the mobile hotspot, mediating the payment through a payment system of the social networking service.

20. The apparatus of claim 14, wherein the apparatus is further configured to:

receive at least a portion of the social graph from a social networking service; and when it is determined, based on the rules, that the payment from the second mobile device is required to access the local network using the mobile hotspot, mediate the payment through a payment system of the social networking service.

\* \* \* \* \*